(No Model.)  C. H. COOLEY.  5 Sheets—Sheet 1.
GRAIN WEIGHER.
No. 442,723.  Patented Dec. 16, 1890.
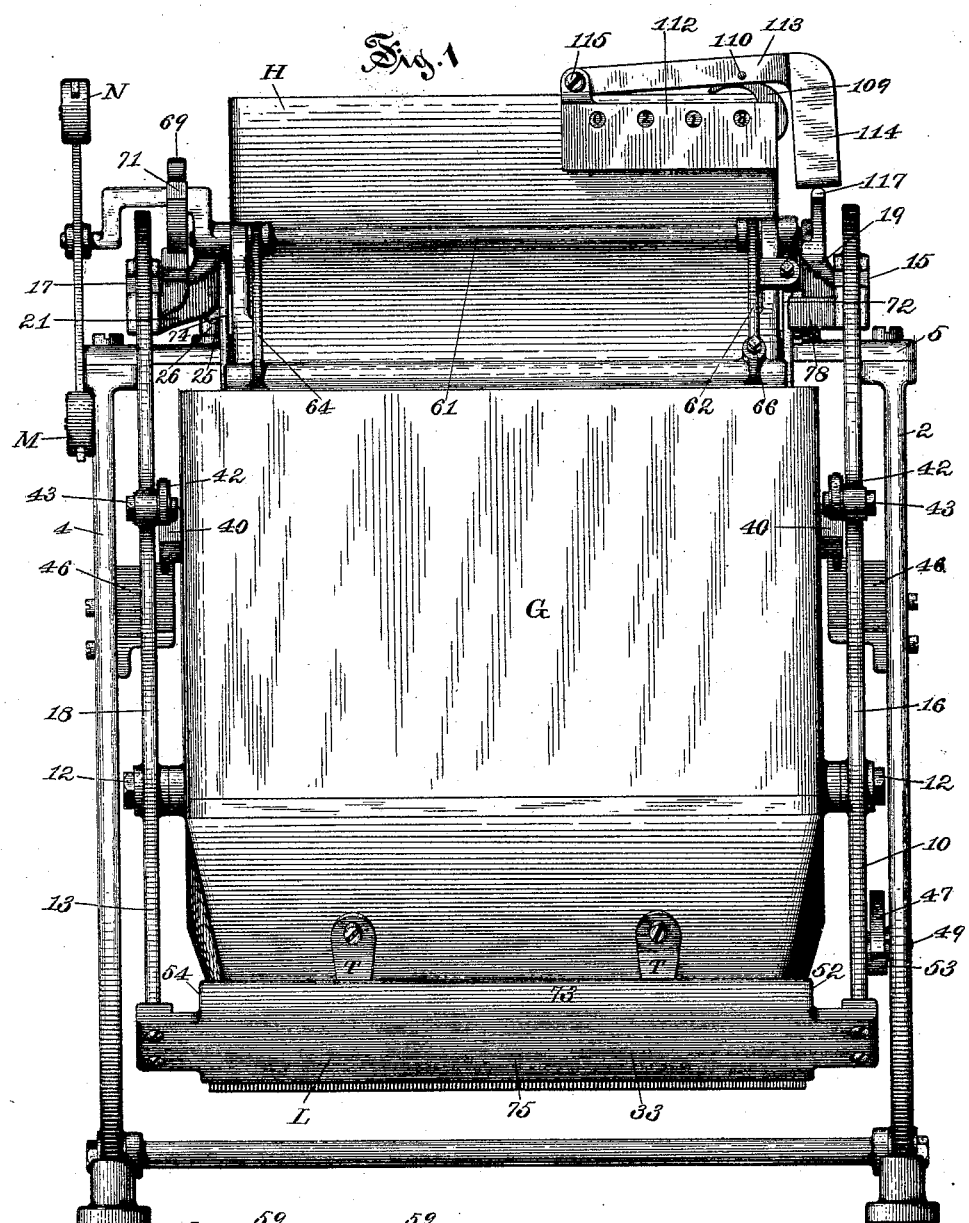
Fig. 1
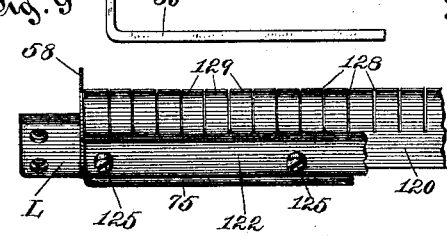
Fig. 9
Fig. 9a
Inventor:
C. H. Cooley,
By his Attorney
F. H. Richards
Witnesses:
W. M. Bjorkman
Henry L. Reckard (No Model.)  5 Sheets—Sheet 2.
C. H. COOLEY.
GRAIN WEIGHER.
No. 442,723.  Patented Dec. 16, 1890.
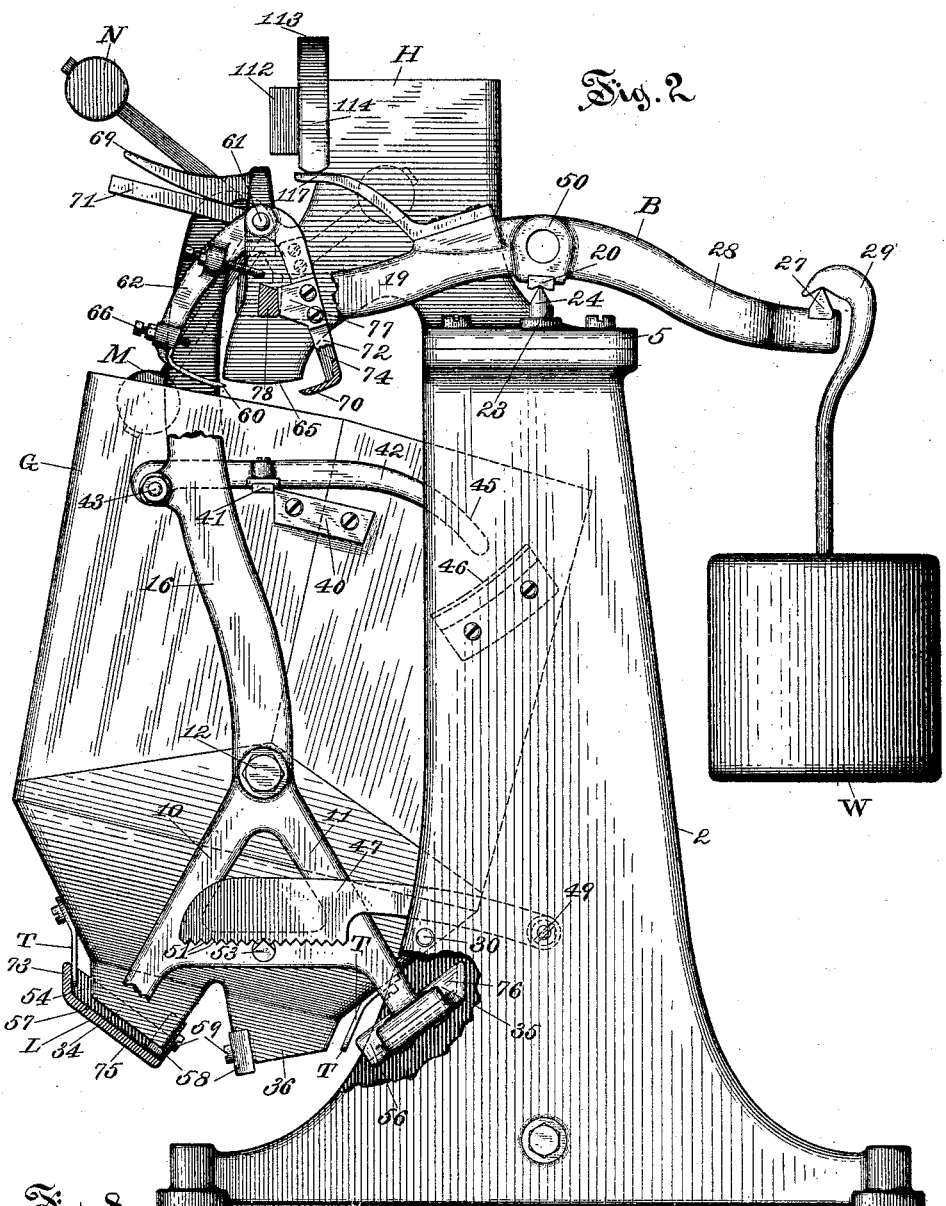
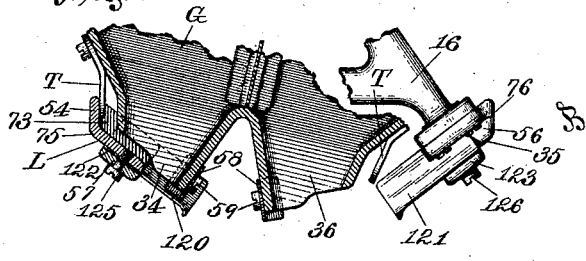
Inventor:
C. H. Cooley,
By his Attorney
F. H. Richards,
Witnesses:
W. M. Bjorkman,
Henry L. Reckard.

(No Model.) 5 Sheets—Sheet 3.
C. H. COOLEY.
GRAIN WEIGHER.
No. 442,723. Patented Dec. 16, 1890.
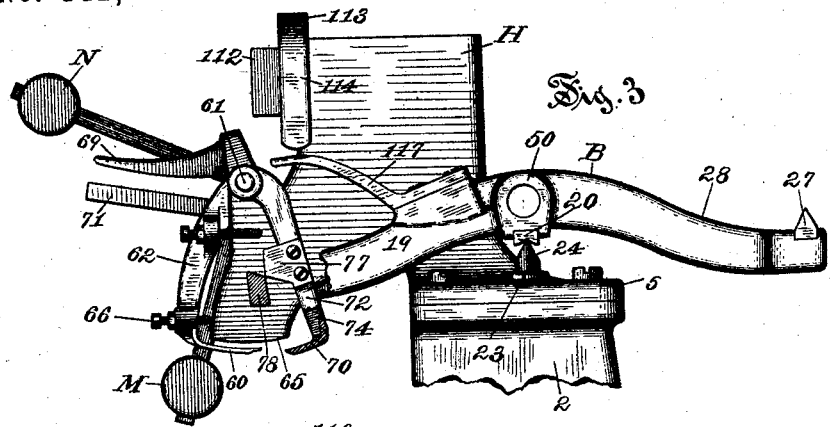
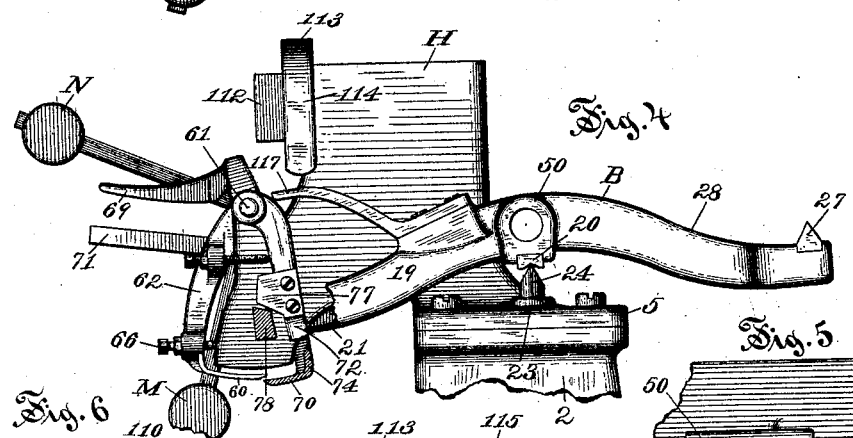
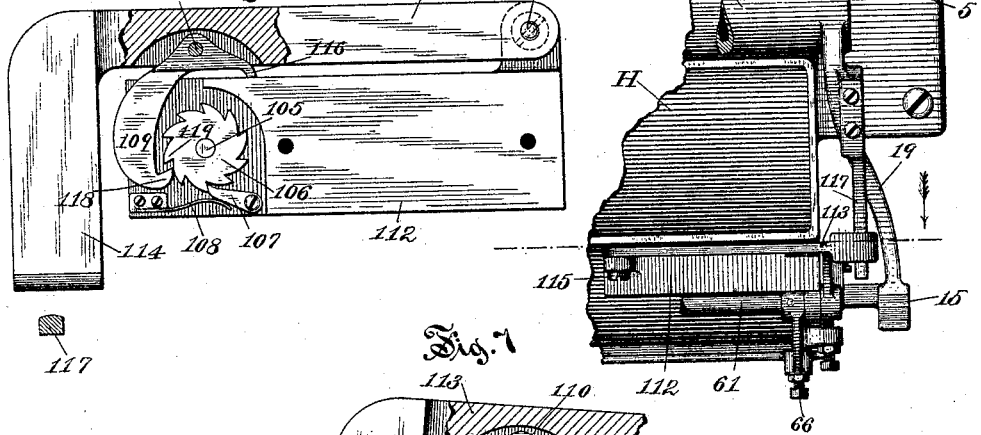
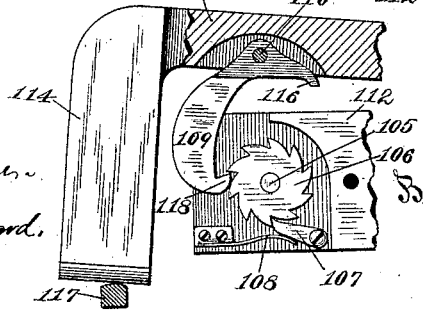

(No Model.)  5 Sheets—Sheet 4.
C. H. COOLEY.
GRAIN WEIGHER.
No. 442,723.   Patented Dec. 16, 1890.
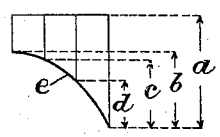
Fig. 15
Force on beam at knife edge:
a, force in Fig. 10 = 8,25
b,  "   "   "  11 = 4,85
c,  "   "   "  12 = 3,30
d,  "   "   "  13 = 2,75
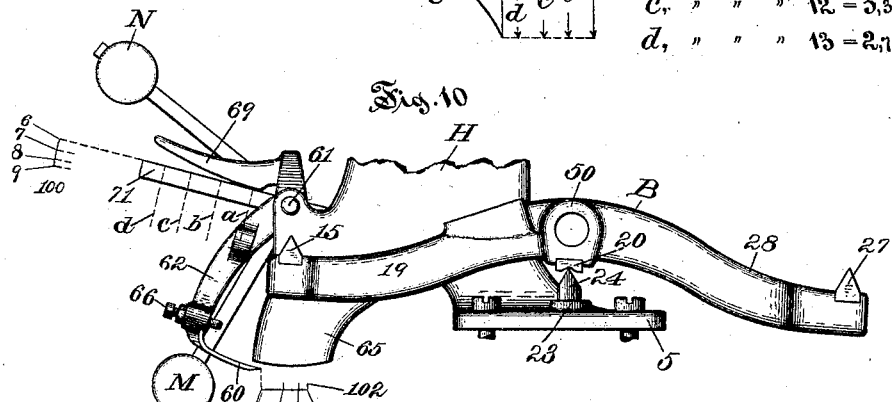
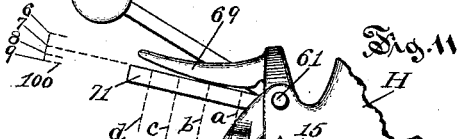
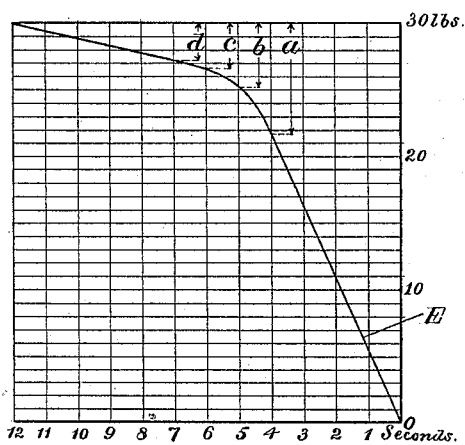
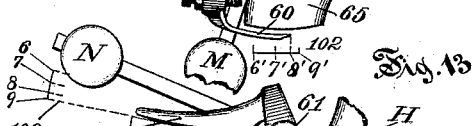
Inventor:
C. H. Cooley,
By his Attorney
F. H. Richards
Witnesses:
W. M. Bjorkman
Henry L. Reckard

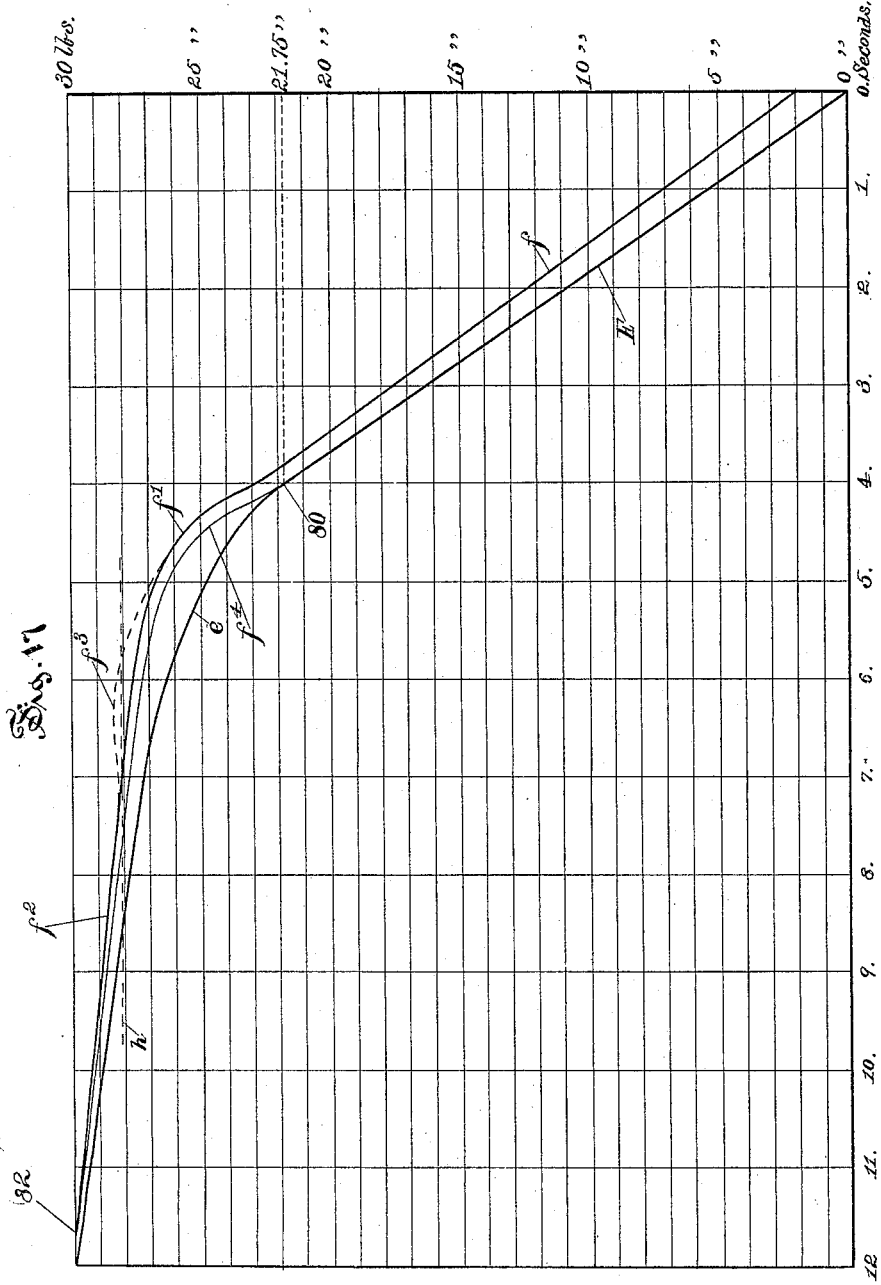

UNITED STATES PATENT OFFICE.

CHARLES H. COOLEY, OF HARTFORD, CONNECTICUT, ASSIGNOR TO THE PRATT & WHITNEY COMPANY, OF SAME PLACE.

GRAIN-WEIGHER.

SPECIFICATION forming part of Letters Patent No. 442,723, dated December 16, 1890.

Application filed January 31, 1890. Serial No. 338,818. (No model.)

*To all whom it may concern:*

Be it known that I, CHARLES H. COOLEY, a citizen of the United States, residing at Hartford, in the county of Hartford and State of Connecticut, have invented certain new and useful Improvements in Grain-Weighers, of which the following is a specification.

This invention relates to automatic grain-weighers operated by the power or weight of the descending grain, and is in the nature of an improvement on the automatic grain-weigher described in my application, Serial No. 338,544, filed January 30, 1890, to which reference may be had.

In the drawings accompanying and forming a part of this specification, Figure 1 is a front elevation of an automatic grain-weigher embodying my improvements. Fig. 2 is a side elevation of the machine, some details being broken away. Figs. 3 and 4 are detail views similar to a portion of Fig. 2, showing successive stages of the operation of the reducing and cut-off valves. Figs. 5, 6, and 7 show the construction and operation of the registering apparatus. Figs. 8, 9, and 9ª show certain details and modifications of the bucket mechanism. Figs. 10, 11, 12, and 13 illustrate one feature of the valve mechanism. Figs. 14, 15, and 16 are diagrams and a table explanatory of said feature and of the utility and advantages thereof. Fig. 17 is an enlarged diagram illustrative of the forces acting on the scale-beam and is supplemental to the preceding diagrams.

Similar characters designate like parts in all the figures.

The frame-work for carrying the operative parts of the machine usually, and as shown in the drawings, comprises two side frames or uprights 2 and 4, held together by ordinary tie-rods or otherwise, and a top plate 5, carrying the supply-chute H.

The grain-bucket G, of the double-chambered type or class used in the well-known "Hill" grain-scale, is suspended under the chute H and discharges its loads of grain intermittingly in the manner substantially as shown in prior Letters Patent of the United States. The grain-bucket G is journaled at 12 in bearings formed in the hangers 16 and 18, which are suspended by V-shaped bearings on the pivots or knife-edges 15 and 17, respectively, of the principal arms 19 21 of the scale-beam B. This beam has V-shaped bearings 20, one at each end thereof, and which rest on the pivots or knife-edges 24 26, that are suitably supported, as by bearings 23 25, on the frame-work. Opposite to arms 19 21 an arm 28 extends and is provided with a pivot or knife-edge 27, on which the main weight W (also designated as the "counterweight") is suspended by hook 29. The oscillation of the bucket G within said hangers is limited by suitable stops, which may be any of the well-known kinds which are shown in prior Letters Patent. Extending to the bottom of the bucket the hangers 16 and 18 are there divided into arms 10 11 and 13 14, (the latter arm 14 corresponds to arm 11 and is hidden behind arm 13 in Fig. 1,) to whose lower ends are attached the closers 33 35 for the discharge-chutes 34 36, respectively, of the grain-bucket. The upper surface of the plate or closer-frame L is or may be set substantially concentric to the axis of the journal 12, substantially as shown in Fig. 2, and at such inclination to a horizontal line as will cause the grain to freely slide down thereon.

For stopping the bucket in its oscillating movement I prefer not to employ the old devices above alluded to, but the spring-stops herein shown. These consist of a suitable spring T, affixed substantially as shown and located to strike a raised part 73 of the bucket-closer. In Fig. 1 it is shown how two of said spring-stops T may be used on the same side of the bucket.

Between the bucket-spout and its closer there is a considerable space 57, sufficiently large to prevent kernels of grain from wedging therein. The inner side of said spout is provided with a thin sheet-metal guard 58, which is held in place by screws 59 and comes down close to the closer (see Fig. 2) and prevents the escape at that point of the grain. This adjustable guard is fixed to the inner wall of the spout, as shown in the drawings, and is adjustable vertically to the closer, so that the space between the lower edge of said guard and said closer may be adjusted properly for weighing different kinds of grain without being clogged by the wedge-shaped broken kernels of grain or letting the grain pass through. On the outer edge of the closer a fixed rim 73 is provided for a like purpose; also, the rims 52, 54, and 56 at the ends of the closers. These minor features, together with the modifications shown in Figs. 8 and 9, are also applicable to the kind of closer shown in my application, Serial No. 338,544, filed January 30, 1890.

As shown in Figs. 8 and 9ª, the closer L may be of a composite construction, the inner edge thereof having the thin sheet-metal closer-plates 120 and 121 attached to the closers proper 75 and 76, respectively, by means of the clamps or straps 122 123 and the screws 125 126. Said closer-plates have slots 128 cut therein, as is best shown in Fig. 9ª, forming the same into comparatively narrow springs 129. Said springs may also be separately attached to the closer L, if preferred. If in the operation of the bucket any kernels of grain, sticks, strings, or other obstructive matter should be caught between the discharge-chutes of the bucket (or the guards 58 thereof) and the said closers, the said springs will yield under the pressure, thereby allowing the bucket to swing fully over.

For locking the bucket in its respective positions and for unlocking the same at the proper times I employ devices which are an improvement on those described for said purpose in prior Letters Patent. In practice I use two of these devices, located one on each side of the bucket; but I will describe one only. A catch 40 is fitted on the bucket, and is fitted to engage with the detent-catch or latch-block 41 on the latch 42, which latch is pivoted by one end at 43 to the hanger or suspender 16. The opposite end 45 of said latch or lever 42 extends back and immediately above the curved abutment 46. When the bucket (loaded in the forward chamber) and hangers stand toward the right hand, as in Fig. 2, the end 45 is over the rearward part of the abutment 46, and when the bucket is carried down by its completed load said rearward part stops the end 45, and thus serves to disengage the catch 41 of said latch from the catch 40. When the positions of the said parts are reversed, (the bucket being loaded in the opposite chamber,) the end 45 stands over the forward part of abutment 46, which then similarly acts to disengage the said catches on the descent of the bucket. By the use of this arrangement I am enabled to use a lever 42, extended far beyond the catch 41, so that a powerful leverage is obtained for disengaging the same, thus reducing the resistance to the downward movement of the bucket and increasing the efficiency and accuracy of the machine, and by making said abutment continuous and of a suitable curvature and location, as shown, a uniform leverage and effect is obtained regardless (within ordinary limits) of the swaying movement of the bucket during said unlocking operation. This particular feature, however, is described and claimed in a separate application, Serial No. 339,967, filed by C. H. Cooley and F. H. Richards February 11, 1890.

So far as relates to the combinations hereinafter claimed, and in which the beam-actuating devices are included, any well-known form or kind of bucket-latches may be used instead of the improved one herein set forth.

For preventing undue swaying of the bucket and hangers I employ a bucket-detent 47, which is in the nature of an improvement on the same kind of device described and claimed in Letters Patent No. 403,988, granted to me May 28, 1889. This detent-arm 47 is attached to some convenient part of the frame-work by a suitable pivot, as 49, and is limited in its downward movement by a fixed stop 30. The lower edge of the arm 47 is furnished with detent-teeth 51, adapted to act on the detent face or pin 53, affixed to the hanger 16. These said notches and pin 51 and 53 are not designed to be "square-notched," so as to lock securely together; but the same are beveled, so that the weight of said arm acts as a gently-restraining force to gradually bring the bucket to rest. When the bucket on the discharge of its load rises and swings over to the opposite side, as described and illustrated in my said patent, the pin 53 slides along under and against the notches 51, and thus gradually reduces the momentum of the bucket. When the beam descends to the poising-point, the arm 47 rests on the stop 30 and the pin 53 stands clear of the notches 51. There being a continuous line of said notches throughout the limits of the swaying movement, these notches are effective regardless of the kind and quantity of grain constituting a load, for the heavier the load of grain the greater is the swaying movement of the bucket, which movement is about twice as great when weighing wheat or corn as when weighing oats or malt. By this means I not only adapt my machine for the weighing of different materials, but also different loads of the same material.

The scale-beam B is shown formed in a single piece, which comprises the arms before mentioned, the shaft 50, and the several knife-edges and V-shaped bearings. The shaft 50 may be formed hollow to secure greater strength and rigidity with a given weight, and, as shown herein, may be located above the axis of oscillation of the beam, which axis of course coincides with the knife-edges 24 and 26. The bearings 20 and 22 are secured to (or formed on) the under side of shaft 50, while the knife-edges 15, 17, and 27 are secured to the upper side of the said arms, respectively, those arms being shaped or curved downwardly to bring the edges 15 and 27 substantially in a plane usually from one-fourth to one-half inch above the said beam-axis. A beam thus constructed I designate as an "overpoise" beam.

When reference is herein made to the movement of the "scale-beam," the movement of the bucket-supporting arms thereof is meant, this coinciding of course with that of the bucket itself. The movement of the beam B is or may be, and is usually, limited in its upward movement by some suitable stops, (not shown,) and is naturally stopped in its downward movement by the discharge of the grain immediately following the tripping of catch 41 by stop 46. A special stop (not shown) may be, and usually is, provided for the latter purpose.

The scale-beam here described is also described and claimed in a separate application, Serial No. 330,405, filed by C. H. Cooley and F. H. Richards November 15, 1889.

The main weight W in my present machine I make to fully balance the weight of the loaded bucket, thus dispensing with the supplemental weight usually employed in this class of grain-weighers to counterbalance the completed load; but, in order to retain the same mode of making up that load by a reduced flow of grain, I employ a smaller resistance or ballast weight, whose action is opposed to that of the main weight prior to the beginning of the "drip" of the column of grain. This resistance-weight, according to my present invention, consists in the weight-actuated reducing-valve and its actuating weight or weights. This feature will be understood from and by the following description of the valve mechanism.

The reducing-valve 60 is carried by arms 62 64, which are suspended from pivot-shaft 61, respectively. This valve closes under the outlet 65 of the chute H somewhat more than half the width thereof, and is limited in said movement by some suitable stop, which may be the adjustable stop 66. The cut-off valve 70 is similarly suspended by arms 72 74 from the said pivot-shaft 61 or from some point near thereto. The arm 72 has a cam-shaped part 77, which is acted on by the cam or valve actuator 78, that is fixed to the beam B. When this beam is down, as in Fig. 4, the valve 70 is closed and (the valve 60 being also closed, as shown) cuts off the flow of grain; but when the beam rises, as in Fig. 3, the actuator 78 strikes cam 77 and forces back arm 74, thus opening the valve 70. The rising of the beam opens both valves, as in Fig. 2, and leaves the flow of grain unobstructed. The two valves 60 and 70 being located on opposite sides of the chute, the necessary stroke of each valve is reduced to minimum.

For a more particular description of the valve 70 and its mode and means of operation and of the manner in which the two valves co-operate reference may be had to my said application, Serial No. 338,544.

The downward movement of the beam comprises three periods: first, of the reduction of the column; second, of the poising of the scale-beam, (shown in Fig. 3;) third, of the discharge of the load. (Shown in Fig. 4.) The first period begins and ends with the closing movement of the reducing-valve. The second begins when the beam-arm leaves the reducing-valve lever and ends when the cut-off valve begins to close. The third is the period of cut-off-valve closure, during which the bucket-latches are unhooked and the load begins discharging. That part of my present improvements herein next described relates more especially to the operation of the machine during the second of said periods, this being the period of reduction of the column.

The reducing-valve is operated directly from the beam by the beam-arm 71, which acts to lift the valve-actuating arm 69, that is fixed to the valve-shaft 61. These arms are curved relatively to each other, so as to produce a graduated movement of the one relative to the other, as hereinafter more fully described in connection with Figs. 10 to 13, inclusive. For the purpose of illustration, and also because conforming to usual practice, the arm 71 is herein shown straight, while all the relative curvature or divergence is shown formed in the arm 69.

By the term "beam-arm" or "valve-actuating arm," as used herein, I mean any part of the beam or any part attached thereto which is located and operated to impart motion to the reducing-valve through its lever 69. It is quite immaterial to my invention whether or not said arm is made integral with the beam or whether it be rigidly or otherwise attached thereto, if only it is so attached as to have a corresponding reciprocatory movement. The valve-actuating arm 71 of the scale-beam and the valve-lever 69 are said to be "curved relatively to each other," because it is not necessary that all the curvature shall be on one said part, nor necessary that the said lever be curved at all, provided the said arm is so shaped as to effect a like purpose; but I deem it preferable to employ the arrangement shown in order to facilitate construction, and also because I thus obtain, as I believe, a better mode of operation with a given precision of workmanship.

For actuating the reducing-valve to close the same the shaft or arm (or arms) thereof is weighted, and one part of my invention relates to the mode of such weighting of said valve. The valve 60, according to this feature of my invention, has two weights, carried, respectively, on radii set in crosswise directions. One said weight N being set to move in an arc adjacent to the horizontal plane of the valve-axis and the other said weight M being set to move in an arc adjacent to the vertical plane of said axis, the first said weight is one of constant effect and the second said weight is one of vanishing effect, and the resultant effect of the combined weights on the scale-beam is made to decrease in a decreasing ratio.

By the term "constant effect," as applied to a valve-closing weight, is meant a weight so connected to and arranged on the valve as to move nearly in a vertical line, so that the effective leverage of said weight varies only slightly throughout its arc of movement, and by the term "vanishing effect," as applied to such a weight, is meant the effect of a weight which is so connected to and arranged on the valve as to have a greater horizontal than vertical movement, and so that on the closing movement of the valve it shall have a decreasing leverage or effect on the scale-beam by reason of its approach toward the vertical plane of the axis of said valve. The sum of the said constant and vanishing effects constitutes the total effect applied to the beam by the valve-lever, which total effect constantly decreases as the beam is borne downward by the increasing load of grain, this decrease being in a peculiar decreasing or differential ratio, which I have discovered by investigation and much practical experiment to be most suitable and efficient in steadily controlling the combined weight and momentum of said increasing and falling load.

For the purpose of more definitely and fully illustrating my present improvements I have in the drawings shown a machine of moderate size, in which the full load consists of one-half bushel of wheat of thirty pounds in weight, and all the quantities given in connection with the several diagrams and the calculations of forces and leverages are based on said capacity.

The mode of operation of the column-reducing apparatus is illustrated step by step in Figs. 10 to 13, inclusive. To facilitate comparison of the several movements, each said figure is provided with the graduated scales 100 and 102, each comprising the corresponding divisions 6, 7, 8, and 9 and 6', 7', 8', and 9', respectively, which divisions also correspond with the equidistant points $a$, $b$, $c$, and $d$ on the beam-arm. It will be evident that the effect of a weight (as, for instance, the weight N) on the beam will be greater when the point of contact of arm 69 on arm 71 is at $a$ or nearest to the axis 61; also, that the direct effective power of the weight N is nearly constant in each of said four figures and that said power of the weight M greatly varies. In order to illustrate this by a calculation, it is assumed the weights N and M each weigh one pound (avoirdupois) and that the valve 60 is substantially without weight, which gives the following approximately correct results:

In Fig. 10, the valve lever contact being at $a$, the effective force on the beam, measured at the knife-edge 15, is 8.25 pounds, as set down in the table, Fig. 15. Consequently the weight of grain in the bucket at the beginning of the closing movement of the valve is 30 pounds minus 8.25 pounds—equal to 21.75 pounds. The pressure at $a$ is rapidly reduced as the said contact-point moves outwardly, being 4.85 pounds at $b$, 3.30 pounds at $c$, and 2.75 pounds at $d$, and these pressures subtracted from the full load of 30 pounds gives the actual load at each of said points of beam movement, respectively. Consequently as the beam descends the load increases in a decreasing ratio until the position is reached which is shown in Fig. 13, where the load is equal to 27.25 pounds and the quantity remaining to be made up by the drip is reduced to 2.75 pounds. In Fig. 14 this ratio is shown graphically by the line $e$, as indicated by the letters $a\ b\ c\ d$ in said figure.

In the diagram Fig. 16 the horizontal distance is divided into twelve parts, representing seconds of time, while the vertical distance is divided into thirty parts, representing pounds in weight. In this diagram the line E is the curve of the loading operation. Beginning at $o$, it represents a full flow of grain for four seconds until the load weights 21.75 pounds, then a reducing flow of three seconds until the load equals 27.25 pounds, and finally a drip of five seconds and weighing 2.75 pounds, and completing the load. For convenience the diagrams Figs. 14 and 16 have been drawn to the same scale, so that the line $e$, Fig. 14, is that part of the line E between vertical lines 4 and 7, Fig. 16. From these diagrams and Figs. 10 to 13, inclusive, and the preceding description thereof it will now be understood how in my improved grain-weigher equal outward advances of the contact-point of the reducing-valve lever correspond to decreasing spaces of valve closure. The spaces 6 to 7, 7 to 8, and 8 to 9 on the scales, Figs. 10 to 13, may be described not only as decreasing spaces, but also as divided spaces, since the first space may be divided by a number equal to one plus a fraction to obtain the second, and the second to obtain the third, and especially since by using precisely the proper curvature of the lever 69 relatively to the arm 71 said divisors may be the same for each space.

The practical utility of the peculiar mode here described of filling the bucket, by which mode the reduction of the column is in a decreasing ratio, arises from the conditions under which the load is made up. For illustrating this feature of the operation of the machine I have made the enlarged diagram Fig. 17. The total actual effect or moment of force on the beam during said reduction is made up of several distinct components—to wit; the weight of the grain in the bucket, the momentum of the moving mass, including the bucket, the grain therein, the scale-beam, and the counter-balance, and the force or impact of the falling column of grain flowing into the bucket. The ratio of the said reduction must therefore be such that at no time during the same shall the total said force on the beam exceed the maximum load minus the drip, or in the present instance 27.25 pounds, for should that total be exceeded by the aggregate of those several forces then the line $f'$ of the diagram Fig. 17 would extend above the drip-level force line $n$, as indicated by the dotted line $f^3$, and the beam-arm 71 would leave the lever 69 on the complete closure of the reducing-valve and the nearly-loaded bucket be started vertically oscillating, thereby reducing the accuracy of the weighing. A diagrammatic line $f^4$, representing the said momentum, would begin at 80, first gradually diverge from and then approach the reduction-line E, and finally pass along and meet the drip-line at the cut-off closure-point 82, as shown in said Fig. 17. Added to this force is that of the falling column or "impact force" represented by the lines $f f' f^2$, which force is greatest prior to the reduction, rapidly decreases during such reduction, and slowly decreases during and terminates with the drip. Practically the impact force ceases, or rather becomes of no effect, at the overpoise point 82, which is that point in the beam movement where the cut-off cam 78 goes so far over the valve-actuator (see Fig. 3) as to pass the point or angle thereof, and to thus take control of the beam to forcibly carry down the same unaided by either the weight or impact force of the drip-column.

Another feature of my invention relates to the means for registering the movements of the scale-beam, and thus ascertaining the number of loads delivered. In the apparatus for said purpose the part 112 constitutes the box-shaped frame or casing, and is secured by any usual means to the front of the supply-chute II. This casing contains register-wheels of the usual type, which are operated in the following manner: The first disk or figured wheel thereof is carried on the pin or stud 105, whose rear end carries the ratchet-wheel 106, which is prevented from backward rotation by the pawl 107, that is held in engagement with the teeth of said wheel by a spring 108, as shown in Fig. 7. By this means the wheel 106 is properly arranged for a regular intermittent rotary movement. A pawl 109, pivoted to the counting-lever 113 by the pin 110, engages with the teeth of the wheel 106 and turns said wheel when the said lever 113 is raised by the register-actuating arm 117, that is secured to the beam-arm 19 by screws in the manner shown in the drawings. The register-lever 113 is attached or connected by the pivot-screw 115 to the box or frame-work 112 of the register or to some other part (not shown) of the machine. The outer end of the lever or arm 113 is usually weighted, or, as shown in the drawings, has a weight 114 formed thereon. The pawl 109 has an arm 116 opposite to the working end 118 thereof, which on the descent of the lever 113 strikes the case 112, (or some other stop provided therefor, but not herein shown,) and thus serves to throw said end 118 forcibly against the wheel 106. This feature secures a high degree of certainty in the operation of the apparatus, since the weight of the arm 113 is thus utilized for throwing the pawl into engagement with said wheel.

Another feature of the registering apparatus relates to the manner of its combination, whereby correctness of registration is secured notwithstanding some oscillation of the beam. By referring to Fig. 3 it will be seen that the beam there stands at the lower point of the poising period or arc, so that any further downward movement will carry the actuator 78 below the angle of cam 77, and thus insure the immediate discharge of the load followed by the full upstroke of the beam. Now it is important in practice that no movement of the beam between its uppermost position and its position in Fig. 3 shall move the wheel 106, unless the beam shall have first passed below said lower end of its poising-arc (shown in Fig. 3) and shall be returning from such position below. Consequently, according to my present improvements, the several said parts are so constructed and organized, substantially as shown, that the pawl 109 will drop under the tooth at 119 of wheel 106, Fig. 6, at once on the actuator 78 passing below the angle of cam 77. By this peculiar organization and mode of operation any movement of the scale-beam above the lower end of its poising arc or period is not effective to register such movement, and if the beam goes below said point the registration is thereby made certain, together with the discharge of the load registered. By this means, also, when the beam is at any point above its said position in Fig. 3 the arm 113 may be operated by hand without danger of actuating the register, and since the beam is below said point for a brief moment at each operation of the machine it follows that my said improvements secure an almost complete security against tampering with the register and against accidental registering and against registration of any partial strokes of the scale-beam.

Having thus described my invention, I claim—

1. In a grain-weigher, the combination, with the supply-chute and a reducing-valve therefor, of the scale-beam and its valve-actuating arm and a lever on said valve and operated by said arm, said lever and arm being curved relatively to each other, substantially as set forth, whereby is obtained a valve-closure by constantly-decreasing spaces which correspond with equal outward advances of the contact-point on the arm and lever.

2. In a grain-weigher, the combination, with the supply-chute and a reducing-valve therefor, of the beam and its valve-actuating arm and a lever on said valve and operated by said arm, said arm and lever being curved relatively to each other, substantially as set forth, whereby is obtained a valve-closure by divided spaces which correspond with equal outward advances of the contact-point on the arm and lever.

3. In a grain-weigher, the combination, with the supply-chute and the scale-beam, of the reducing-valve and its lever curved relatively to the bearing thereof on said beam, a cut-off valve, and means actuating said cut-off valve from the beam, all being organized and coacting, substantially as set forth, to first close the reducing-valve with a decreasing ratio and afterward to close the cut-off valve.

4. In a grain-weigher, the combination, with the scale-beam and supply-chute, of the reducing-valve and its operating-lever and two valve-closing weights set on radii in crosswise directions, one said weight being set to move in an arc adjacent to the horizontal plane of the valve-axis and the other said weight being set to move in an arc adjacent to the vertical plane of said axis, whereby the first said weight is one of constant effect and the second said weight is one of vanishing effect, and whereby the resultant effect on the scale-beam of the combined weights is made to decrease in a decreasing ratio.

5. In a grain-weigher, the combination, with the scale-beam and supply-chute, of the reducing-valve, the curved lever 69, bearing on said beam, the weight N, carried by the valve located to have substantially constant effect, and a weight, substantially as described, carried by the valve and of vanishing effect.

6. In a grain-weigher, the combination, with the supply-chute, the scale-beam, and the reducing and cut-off valves, of a lever on the reducing-valve, a valve-actuating arm on the scale-beam for operating said reducing-valve lever, said arm and lever being curved relatively to each other and having their working-faces crosswise to their line of movement, whereby the reducing-valve is gradually closed prior to the poising, an arm on the cut-off valve having a detent-face substantially parallel to said movement, and a valve-actuator located on the scale-beam and arranged to bear against said detent-face during the reducing-valve closure and during the poising of the beam, whereby the reducing-valve is closed prior to the poising, and whereby the cut-off valve is held substantially at rest during said closure and during the poising.

7. In a grain-weigher, the combination, with the supply-chute, the scale beam, and the reducing and cut-off valves, of a curved lever on the reducing-valve and set substantially radial to the axis of the beam, an arm operated by the beam and operating said reducing-valve lever, an arm on the cut-off valve having a detent-face crosswise to a radial line from said face to the scale-beam axis, and a valve-actuator carried by the scale-beam and arranged to bear against said detent-face during the poising of the scale-beam, whereby the cut-off valve is detained from closing during the gradual closure of the reducing-valve and during the poising, and whereby the pressure of the cut-off valve against the beam is brought radial to the axis of the beam and made neutral during the poising.

8. In a grain-weigher, the combination, with the scale-beam having the cut-off-valve actuator and with the cut-off valve having a detent-face bearing on the neutral face of said actuator while this valve is open, of the register having a ratchet-wheel, substantially as described, and a pawl and lever constructed and arranged to be operated by the beam to turn said ratchet-wheel on the rising of the beam from its lowest position, the whole being organized and coacting to engage the pawl under a succeeding ratchet-tooth on the passing of said detent-face below the neutral face of said actuator.

9. In a grain-weigher, the combination, with the hangers suspended from the scale-beam and with the fixed closer on said hangers, of the oscillating grain-bucket pivoted in the hangers above the closer and having its discharge-spout contiguous to the closer, and the adjustable guard fixed on the inner wall of said spout and adjustable vertically to said closer, the movement of the closer relatively to the bucket-spout being laterally to the adjustable guard.

10. In a grain-weigher, the combination, with the grain-bucket, of the closer for the spout thereof, said closer comprising a rigid plate and a spring-plate extending therefrom.

11. In a grain-weigher, the combination, with the grain-bucket having spout 34, of the closer for said spout, comprising the plate 75 and the springs 129, extending forward of said plate under the wall of said spout.

12. In a grain-weigher having a bucket suspended substantially as specified, the combination, with the hanger having the detent-face thereon, of a detent-arm provided with beveled notches bearing on said detent-face.

13. In a grain-weigher, the combination, with the hanger having the detent-face, of the detent-arm having a row of beveled notches adapted to engage said face and a stop limiting the downward movement of said detent-arm.

14. In a grain-weigher, the combination, with the rising and falling hanger having the detent-face, of the detent-arm 47, pivoted substantially as shown and having teeth 51, and the fixed stop 30, set to support said arm when the beam descends to the poising-point.

15. The combination, with the scale-beam and with the hangers suspended therefrom and having bearings for the bucket and below said bearings carrying bucket-closers having thereon bucket-stops, substantially as described, of the bucket journaled in said bearings and operating in connection with said closers, and springs, substantially as described, carried on the bucket and arranged to strike said bucket-stops, thereby to relieve the shock of the moving loaded bucket.

16. In a grain-weigher, the combination, with the scale-beam and with the reducing-valve, of a cam-arm operating said valve from the beam to close the same by a graduated movement and constructed to bear on the beam with an effect decreasing during said closing movement, the cut-off valve, and means actuating said cut-off valve from the beam, all being organized and coacting to first close the reducing-valve by a graduated movement and afterward to close the cut-off valve.

17. In a grain-weigher, the combination, with the scale-beam and with the reducing-valve, of means operating said valve from the beam to close the same by a graduated movement, and two valve-closing weights set on radii in crosswise directions, one said weight being set to move in an arc adjacent to the horizontal plane of the valve-axis and the other said weight being set to move in an arc adjacent to the vertical plane of said axis, whereby the first said weight is one of constant effect and the second said weight is one of vanishing effect, and whereby the resultant effect on the scale-beam of the combined weights is made to decrease in a decreasing ratio.

18. In a grain-weigher, the combination, with the scale-beam and with the reducing-valve, of means operating said valve from the beam to close the same by a graduated movement, one weight carried by the valve and located to have substantially constant effect, and a weight, substantially as described, carried by the valve and of vanishing effect.

19. In a grain-weigher, the combination, with the scale-beam and with the reducing and cut-off valves, of means operating the reducing-valve from the beam to close the same by a graduated movement, an arm on the cut-off valve having a detent-face substantially parallel to said movement, and a valve-actuator located on the scale-beam and arranged to bear against said detent-face during the reducing-valve closure and during the poising of the beam, whereby the reducing-valve is closed prior to the poising, and whereby the cut-off valve is held substantially at rest during said closure and during the poising.

20. In a grain-weigher, the combination, with the scale-beam and with the reducing and cut-off valves, of means operating the reducing-valve from the beam to close the same by a graduated movement, an arm on the cut-off valve having a detent-face crosswise to a radial line from said face to the scale-beam axis, and a valve-actuator carried by the scale-beam and arranged to bear against said detent-face during the poising of the scale-beam, whereby the cut-off valve is detained from closing during the gradual closure of the reducing-valve and during the poising, and whereby the pressure of the cut-off valve against the beam is brought radial to the axis of the beam and made neutral during the poising.

CHARLES H. COOLEY.

Witnesses:
W. M. BYORKMAN,
HENRY L. RECKARD.